United States Patent
Faruque et al.

(10) Patent No.: US 11,713,082 B2
(45) Date of Patent: Aug. 1, 2023

(54) VEHICLE FRAME

(71) Applicant: Ford Global Technologies, LLC, Dearborn, MI (US)

(72) Inventors: Mohammad Omar Faruque, Ann Arbor, MI (US); S. M Iskander Farooq, Novi, MI (US); Dean M. Jaradi, Macomb, MI (US); Saeed David Barbat, Novi, MI (US); Mohamed Ridha Baccouche, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 222 days.

(21) Appl. No.: 17/116,151

(22) Filed: Dec. 9, 2020

(65) Prior Publication Data
US 2022/0177036 A1   Jun. 9, 2022

(51) Int. Cl.
*B62D 21/15* (2006.01)
*B62D 21/02* (2006.01)

(52) U.S. Cl.
CPC ........... *B62D 21/152* (2013.01); *B62D 21/02* (2013.01)

(58) Field of Classification Search
CPC ..... B62D 21/15; B62D 21/152; B62D 25/085
USPC ........................................................ 180/232
See application file for complete search history.

(56) References Cited

U.S. PATENT DOCUMENTS

| | | | | |
|---|---|---|---|---|
| 4,089,385 A * | 5/1978 | Payoux | ................ | B60K 5/1283 180/300 |
| 4,836,321 A * | 6/1989 | Baumann | ................ | B62D 21/15 180/291 |
| 5,154,253 A * | 10/1992 | Vollmer | .................... | B60K 5/12 180/274 |
| 5,466,006 A * | 11/1995 | Neumann | ............ | B62D 21/155 180/291 |
| 5,947,223 A * | 9/1999 | Rebmann | ................ | B60R 21/00 180/291 |
| 6,276,484 B1 * | 8/2001 | Evans | .................. | B60K 5/1275 180/291 |
| 7,070,015 B2 * | 7/2006 | Mathews | ................ | B60R 16/04 180/274 |
| 7,669,688 B2 * | 3/2010 | Yamaguchi | .......... | B62D 21/152 180/312 |
| 2001/0037908 A1 * | 11/2001 | Motozawa | ........... | B62D 21/152 296/68.1 |
| 2008/0265621 A1 * | 10/2008 | Morschheuser | ....... | B62D 21/15 296/187.03 |

(Continued)

FOREIGN PATENT DOCUMENTS

| | | |
|---|---|---|
| DE | 102018222018 A1 | 6/2020 |
| FR | 2979079 A1 | 2/2013 |

*Primary Examiner* — Jeffrey J Restifo
(74) *Attorney, Agent, or Firm* — Frank A. MacKenzie; Bejin Bieneman PLC

(57) ABSTRACT

A vehicle includes a frame including two frame rails spaced from each other along a cross-vehicle axis and a bulkhead extending from one frame rail to the other frame rail. The frame rails are elongated along a vehicle-longitudinal axis. An engine is disposed between the frame rails and is spaced from the bulkhead along the vehicle-longitudinal axis. A cable is elongated along the cross-vehicle axis and is disposed between the engine and the bulkhead. The cable is connected to each frame rail between the engine and bulkhead.

20 Claims, 5 Drawing Sheets

(56) References Cited

U.S. PATENT DOCUMENTS

| | | | |
|---|---|---|---|
| 2009/0322123 A1* | 12/2009 | Tanaka | B60R 19/02 |
| | | | 296/203.02 |
| 2010/0004826 A1* | 1/2010 | Ostling | F16B 37/0864 |
| | | | 701/45 |
| 2011/0284298 A1* | 11/2011 | Ajisaka | B60H 1/00542 |
| | | | 180/65.21 |
| 2013/0307330 A1* | 11/2013 | Hotta | B60L 50/60 |
| | | | 307/10.1 |
| 2016/0121933 A1* | 5/2016 | Oh | B60K 5/04 |
| | | | 180/297 |
| 2019/0232895 A1* | 8/2019 | Yamada | B60K 1/00 |
| 2022/0063727 A1* | 3/2022 | Faruque | B62D 21/11 |
| 2022/0177036 A1* | 6/2022 | Faruque | B62D 21/02 |

* cited by examiner

VEHICLE FRAME

BACKGROUND

During a rigid pole frontal impact of a vehicle, a direction of the impact may be between frame rails of the vehicle. The rigid pole frontal impact can be simulated with a rigid pole frontal crash test. For example, the Insurance Institute for Highway Safety (IIHS) sets a standard for a rigid pole frontal crash test in which the vehicle impacts a rigid pole at 40 miles/hour. The rigid pole has a diameter of 10 inches and impacts the vehicle along the centerline of the vehicle. During the rigid pole frontal impact, the rigid pole impacts a bumper beam and moves the bumper beam towards the rear of the vehicle. In this situation, the bumper and/or other components of the vehicle may force an engine toward a passenger cabin of the vehicle.

DETAILED DESCRIPTION

Figure 1:
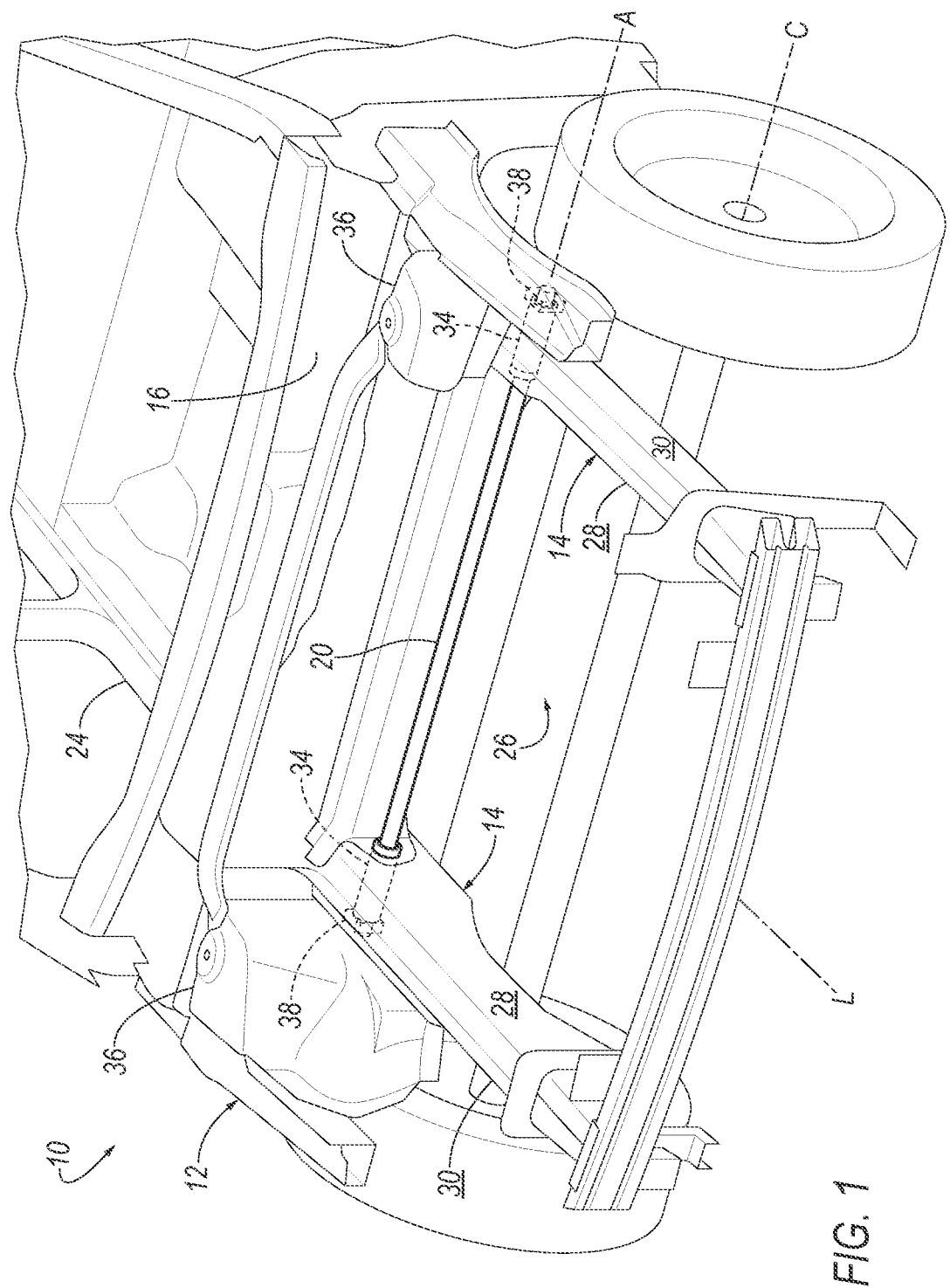
FIG. 1 is a perspective view of a vehicle frame including a cable extending along a cross-vehicle axis through frame rails.

A vehicle includes a frame having two frame rails spaced from each other along a cross-vehicle axis and a bulkhead extending from one frame rail to the other frame rail. The frame rails are elongated along a vehicle-longitudinal axis. An engine is disposed between the frame rails and is spaced from the bulkhead along the vehicle-longitudinal axis. A cable is elongated along the cross-vehicle axis and is disposed between the engine and the bulkhead. The cable is connected to each frame rail between the engine and bulkhead.

Each frame rail may include an inboard face facing the engine and an outboard face spaced from the inboard face along the cross-vehicle axis. The cable may extend through the inboard faces and the outboard faces of the frame rails.

The cable may be fixed to the outboard face of each frame rail.

The vehicle may include two brackets. Each bracket may be fixed to the outboard face of one respective frame rail. The cable may be threadedly engaged with the brackets.

The cable may be fixed relative to each frame rail.

The cable may extend through the frame rails along an axis generally parallel to the cross-vehicle axis.

The cable may be spaced from the engine and the bulkhead.

The cable may be under tension between the frame rails.

The vehicle may include two spacers. Each spacer may extend through one respective frame rail, and the cable may extend through the spacers.

The spacers may be aligned with each other along the vehicle-longitudinal axis.

The cable may be designed to oppose movement of the engine towards the bulkhead during a vehicle frontal impact.

A vehicle frame includes two frame rails spaced from each other along a cross-vehicle axis, and two shock tower brackets. Each shock tower bracket is connected to one respective frame rail. A cable is elongated along the cross-vehicle axis and is disposed vehicle-rearward of the shock tower brackets. The cable is connected to each frame rail vehicle-rearward of the shock tower brackets.

The cable may extend through the frame rails along an axis generally parallel to the cross-vehicle axis.

The cable may be under tension between the frame rails.

Each frame rail may include an outboard face facing the respective shock tower bracket and an inboard face spaced from the outboard face along the cross-vehicle axis. The cable may extend through the inboard faces and the outboard faces of the frame rails.

The cable may be fixed to the outboard face of each frame rail.

The vehicle frame may include two brackets. Each bracket may be fixed to the outboard face of one respective frame rail. The cable may be threadedly engaged with the brackets.

The cable may be fixed relative to each frame rail.

The vehicle frame may include two spacers. Each spacer may extend through one respective frame rail, and the cable may extend through the spacers.

The spacers may be aligned with each other along a vehicle-longitudinal axis.

With reference to the Figures, wherein like numerals indicate like parts throughout the several views, a frame 12 for a vehicle 10 is generally shown. The frame 12 includes two frame rails 14 spaced from each other along a cross-vehicle axis C and elongated along a vehicle-longitudinal axis L. A bulkhead 16 extends from one frame rail 14 to the other frame rail 14. An engine 18 is disposed between the frame rails 14 and is spaced from the bulkhead 16 along the vehicle-longitudinal axis L. A cable 20 is elongated along the cross-vehicle axis C and is disposed between the engine 18 and the bulkhead 16. The cable 20 is connected to each frame rail 14 between the engine 18 and bulkhead 16.

Figure 4A:
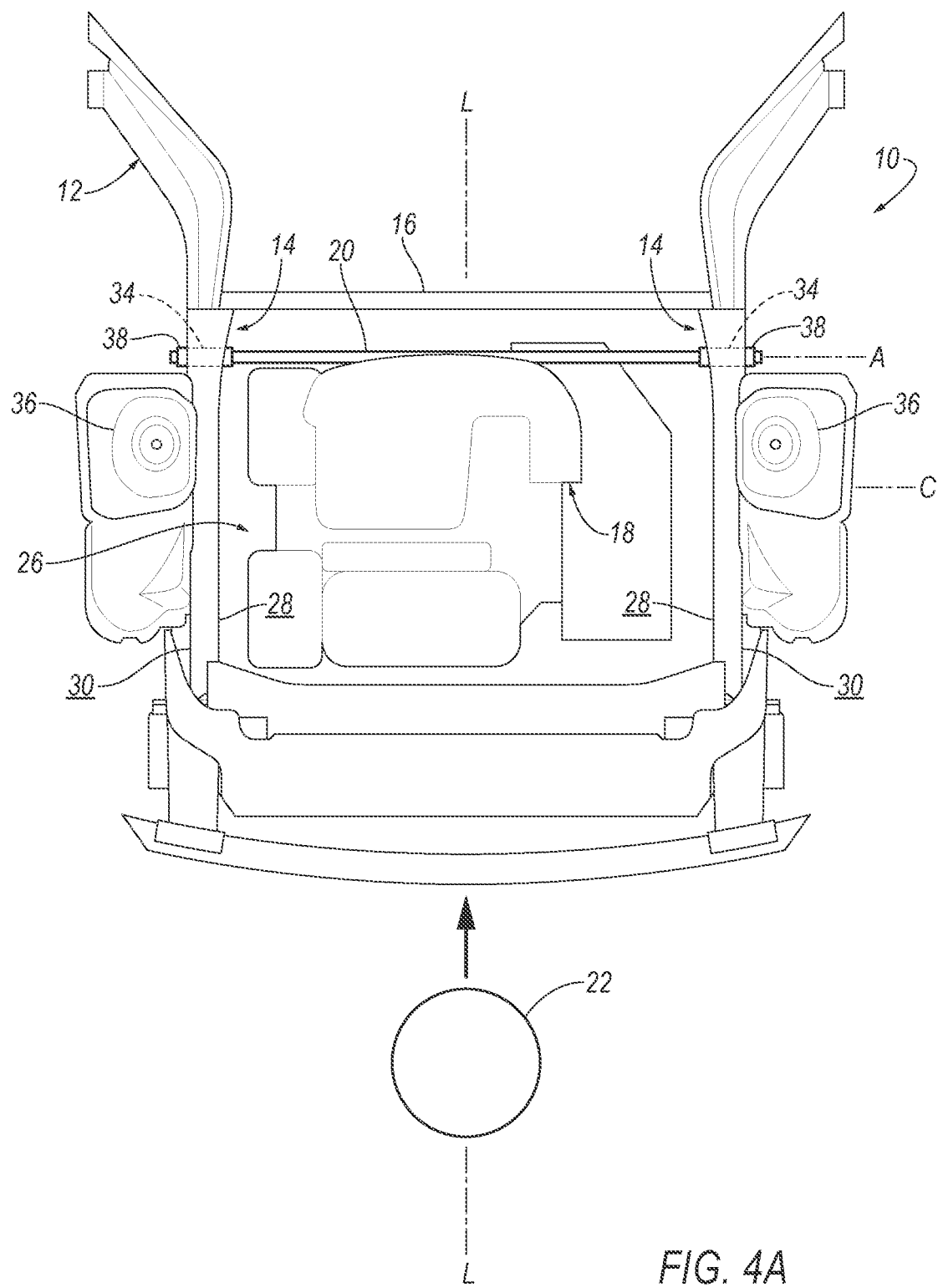
FIG. 4A is a top view of a portion of the vehicle frame at an initial stage of a rigid pole frontal impact test.
Figure 4B:
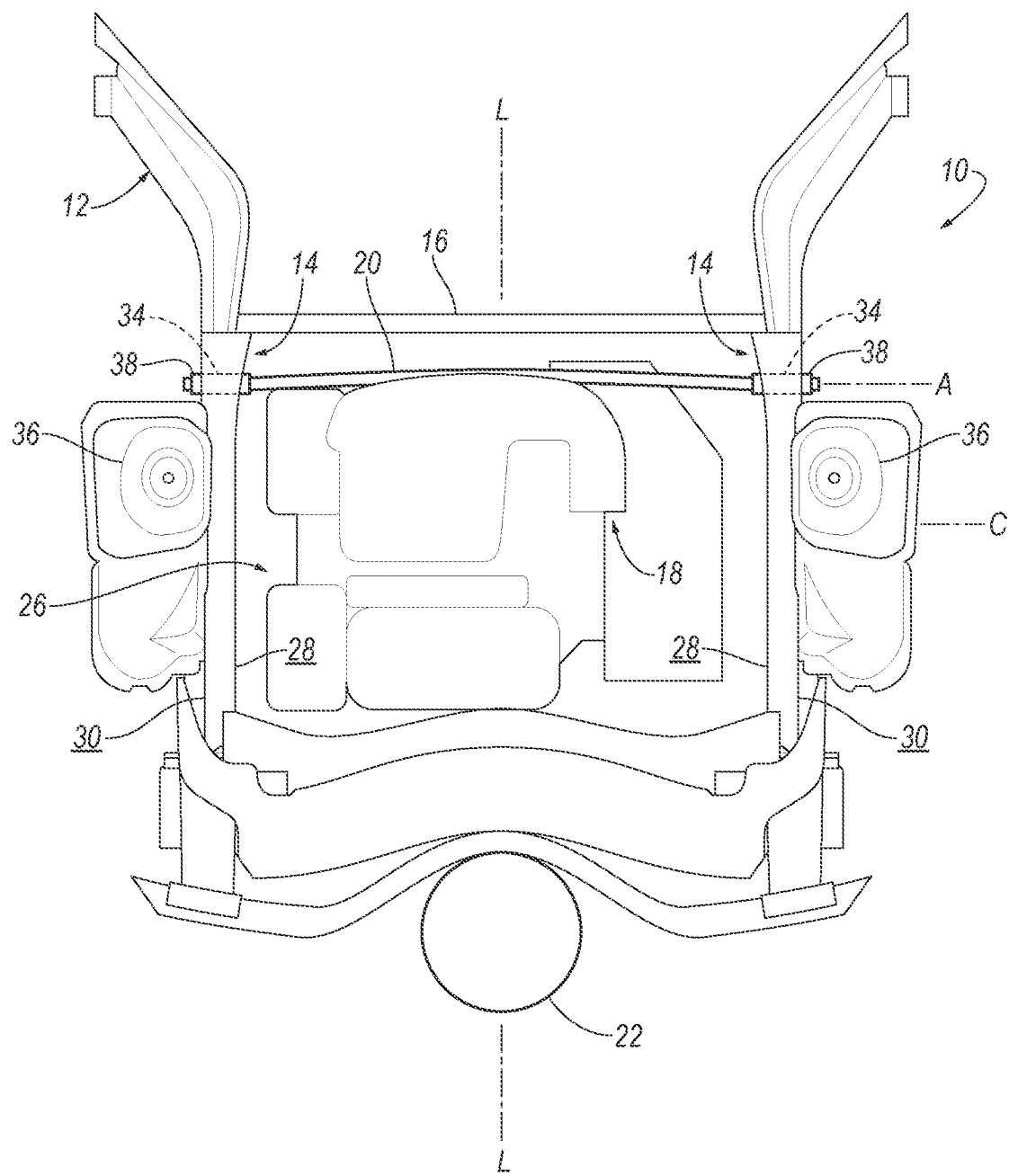
FIG. 4B is the top view of FIG. 4A at a later stage of the rigid pole frontal impact test.

During a vehicle-frontal impact of the vehicle 10, force on the vehicle 10 may force the engine 18 towards a passenger cabin of the vehicle 10. For example, in a rigid pole frontal crash test as shown in FIGS. 4A and 4B, a rigid barrier 22 exerts a force on the vehicle 10, which can force the engine 18 towards a passenger cabin. As the engine 18 moves rearward, the engine 18 exerts a force on the cable 20, and the cable 20 distributes a force from the engine 18 to the frame rails 14. This reduces the likelihood of a direct impact between the engine 18 and the bulkhead 16 thereby reducing the likelihood of engine 18 intrusion into the passenger cabin of the vehicle 10 during the vehicle-frontal impact, e.g., a rigid pole frontal crash test. Specifically, the cable 20 remains connected to the frame rails 14 such that the cable 20 remains under tension during the rigid pole frontal crash test. Thus, during the rigid pole frontal crash test, the cable 20 directs the force from the rigid barrier 22 away from the passenger cabin and opposes movement of the engine 18 towards the bulkhead 16, i.e., the passenger cabin.

With reference to FIG. 1, the vehicle 10 may be any type of passenger or commercial automobile such as a car, a truck, a sport utility vehicle, a crossover, a van, a minivan, a taxi, a bus, etc.

The vehicle 10 defines the cross-vehicle axis C, i.e., extending between a left side and a right side of the vehicle 10. The vehicle 10 defines the vehicle-longitudinal axis L, i.e., extending between a front and a rear of the vehicle 10. The vehicle-longitudinal axis L and the cross-vehicle axis C may be perpendicular to each other.

The vehicle 10 includes a body 24. The vehicle 10 may be of a unibody construction, in which the frame 12, including the frame rails 14, and the body 24 of the vehicle 10 are a single component. The vehicle 10 may, alternatively, be of a body-on-frame construction, in which the frame 12, e.g., the frame rails 14, supports the body 24 that is a separate component from the frame 12. The frame 12 and body 24 may be formed of any suitable material, for example, steel, aluminum, etc.

The body 24 defines a passenger cabin (not numbered) to house occupants, if any, of the vehicle 10. The body 24 may include a roof (not shown) and a floor (not numbered) with the roof defining an upper boundary of the passenger cabin and the floor defining a lower boundary of the passenger cabin. The passenger cabin may extend across the vehicle 10, i.e., from one side to the other side of the vehicle 10. The passenger cabin includes a front end and a rear end with the front end being in front of the rear end during forward movement of the vehicle 10.

The body 24 includes the bulkhead 16. The bulkhead 16 is disposed at the front end of the passenger cabin. That is, the bulkhead 16 may be disposed vehicle-forward of front seats (not shown) in the passenger cabin. The bulkhead 16 may extend completely across the front end of the passenger cabin relative to the cross-vehicle axis C. The bulkhead 16 may extend from the floor of the passenger cabin to a windshield. The bulkhead 16 may be fixed to the floor completely across the front end of the passenger cabin, i.e., from one side of the passenger cabin to the other side of the passenger cabin, relative to the cross-vehicle axis C. The bulkhead 16 may support a plurality of vehicle components. For example, the bulkhead 16 may support an instrument panel (not shown). The bulkhead 16 may be formed of any suitable material, for example, steel, aluminum, etc.

The frame 12 and the body 24 may define an engine compartment 26 that houses the engine 18. For example, the engine compartment 26 may be vehicle-forward of the passenger cabin. Specifically, the bulkhead 16 separates the engine compartment 26 from the passenger cabin. That is, the bulkhead 16 partially defines the engine compartment 26 and partially defines the passenger cabin. The engine 18 may be any suitable type of engine 18, e.g., an internal combustion engine, an electrical engine, a hybrid engine, etc.

Figure 3:
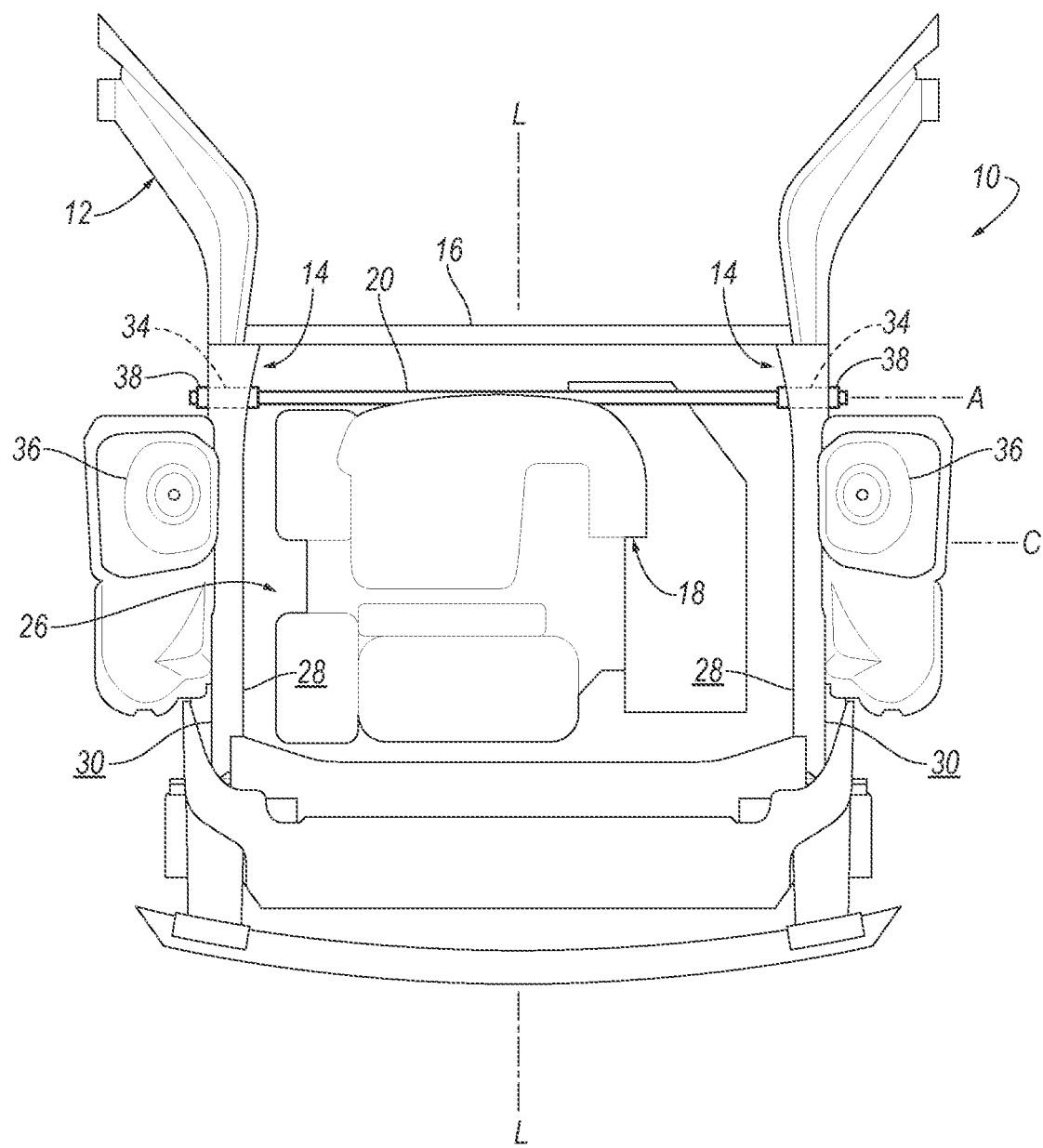
FIG. 3 is a top view of the vehicle frame of FIG. 1.

With reference to FIG. 3, the frame rails 14 are fixed relative to each other. Each frame rail 14 is elongated along the vehicle-longitudinal axis L, as set forth above. For example, each frame rail 14 may extend from the front of the vehicle 10 to the rear of the vehicle 10. The frame rails 14 are spaced from each other along the cross-vehicle axis C, as set forth above. The frame rails 14 may be partially disposed in the engine compartment 26. Specifically, the engine 18 is disposed between the frame rails 14 in the engine compartment 26. The engine 18 is fixed relative to the frame rails 14. For example, the engine 18 may be connected directly to the frame rails 14, e.g., via fastener, welding, etc. As another example, the engine 18 may be indirectly connected to the frame rails 14, e.g., via one or more intermediate components.

Each frame rail 14 may include an inboard face 28 and an outboard face 30 spaced from the inboard face 28 along the cross-vehicle axis C. The inboard faces 28 of the frame rails 14 may face each other. In other words, the inboard faces 28 may face towards the engine compartment 26, i.e., the engine 18. The outboard faces 30 of the frame rails 14 may face away from each other. In other words, the outboard faces 30 may face away from the engine compartment 26. The frame rails 14 may be metal or any other suitable material.

Figure 2:
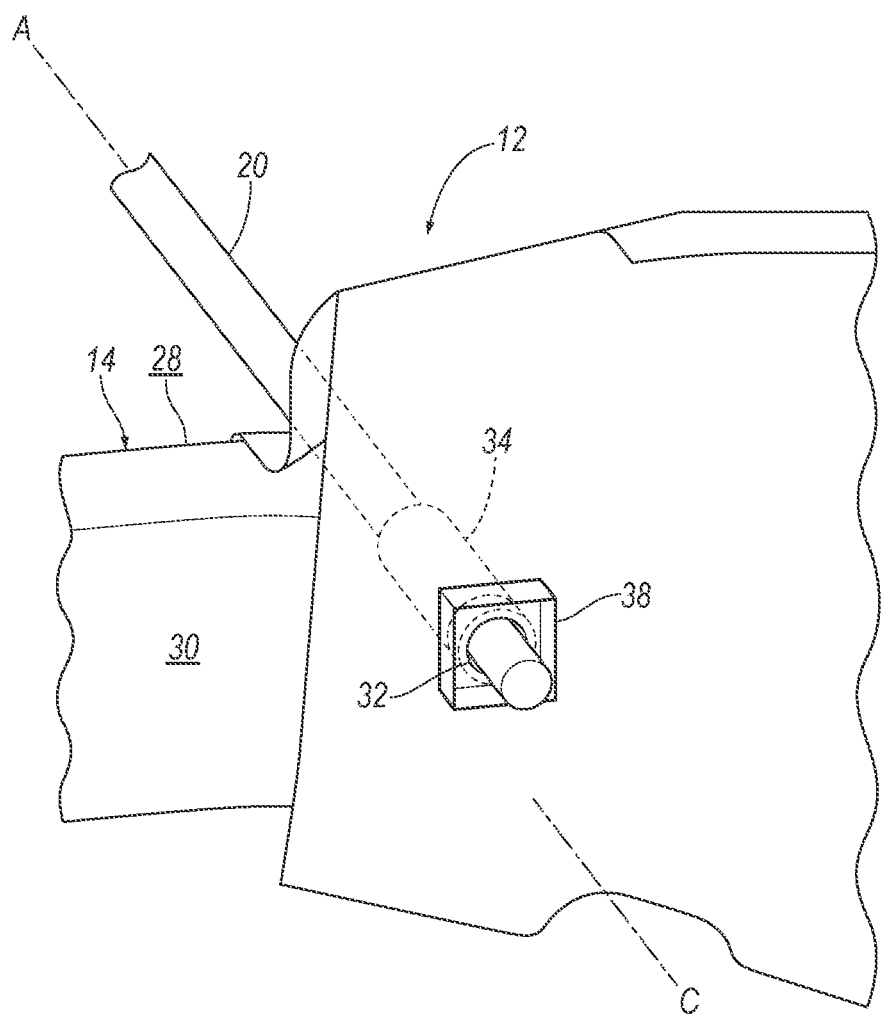
FIG. 2 is a magnified view of the cable extending through one frame rail.

Each frame rail 14 includes a hole 32 extending through the respective frame rail 14, i.e., the respective inboard and outboard faces 28, 30, as shown in FIG. 2. The hole 32 may extend through the respective frame rail 14 along an axis A generally parallel to the cross-vehicle axis C. In this context, "generally" means that the axis A extends left and right through the hole 32 even if the axis A deviates slightly from horizontal. The holes 32 may be aligned with each other along the vehicle longitudinal axis L. The holes 32 may be between the engine 18 and the bulkhead 16 along the vehicle longitudinal axis L. The holes 32 may be designed, i.e., sized and shaped, to receive the cable 20.

The frame 12 may include a plurality of spacers 34. Each spacer 34 may be disposed in one respective hole 32. In the example shown in the Figures, the frame 12 includes two spacers 34. In such an example, one of the spacers 34 is disposed in the hole 32 of one frame rail 14, as shown in FIG. 2, and the other of the spacers 34 is disposed in the hole 32 of the other frame rail 14. The spacer 34 may extend through the hole 32 in the frame rail 14. For example, the spacer 34 may extend from the outboard face 30 of the respective frame rail 14 to the inboard face 28 of the respective frame rail 14. As another example, the spacer 34 may extend beyond the inboard face 28 and/or the outboard face 30 of the respective frame rail 14 relative to the cross-vehicle axis C. Each spacer 34 is designed, i.e., sized and shaped, to receive the cable 20. Specifically, each spacer 34 is hollow. That is, each spacer 34 defines a cavity extending along the axis A through the respective spacer 34. A diameter of the cavity is larger than the diameter of the cable 20 such that the cable 20 can be passed through the cavity of the spacer 34.

The spacer 34 may be fixed to the frame rail 14, e.g., via a fastener, welding, etc. The spacer 34 may be metal. For example, the spacer 34 may be the same material as the frame rail 14. The spacer 34 reinforces the hole 32, e.g., to resist deformation of the holes 32 during the vehicle impact, which assists in transferring forces during the vehicle impact from the cable 20 to the frame rails 14.

Returning to FIG. 3, the frame 12 includes shock tower brackets 36. The shock tower brackets 36 connect the frame 12, e.g., the frame rails 14, to a suspension system (not shown) of the vehicle 10. For example, the shock tower brackets 36 may connect to a dampener and a coil-over spring shock absorber. The shock tower brackets 36 are spaced from the bulkhead 16 along the vehicle-longitudinal axis L.

The shock tower brackets 36 are fixed relative to the frame rails 14. For example, one or more shock tower brackets 36 may be connected to one frame rail 14, and one or more shock tower brackets 36 may be connected to the other frame rail 14. The shock tower brackets 36 may be connected directly to the respective frame rail 14, e.g., via fastener, welding, etc. As another example, the shock tower brackets 36 may be indirectly connected to the respective frame rail 14, e.g., via one or more intermediate components. The shock tower brackets 36 may be metal or any other suitable material.

In the example shown in the Figures, the frame 12 includes two shock tower brackets 36 aligned with each other along the vehicle-longitudinal axis L. One of the shock tower brackets 36 is connected to one frame rail 14, and the other shock tower bracket 36 is connected to the other frame rail 14. Each shock tower bracket 36 is disposed outboard of the respective frame rail 14 along the cross-vehicle axis C. In other words, the outboard face 30 of each frame rail 14 faces the respective shock tower bracket 36. That is, the frame rails 14 are disposed between the shock tower brackets 36.

The frame 12 may include a bracket 38 supported by each frame rail 14. The bracket 38 may be disposed on the outboard face 30 of the respective frame rail 14, as shown in FIG. 2. The bracket 38 may be disposed vehicle-forward of the bulkhead 16. That is, the bracket 38 may be disposed between the bulkhead 16 and the engine 18, i.e., in the engine compartment 26, as shown in FIG. 3. For example, the brackets 38 may be disposed between the shock tower brackets 36 and the bulkhead 16 relative to the vehicle-longitudinal axis L. The bracket 38 may include a feature for threadedly engaging the cable 20, e.g., a weld nut. The bracket 38 may, for example, be fixed to the respective frame rail 14, e.g., via fasteners, welding, etc. That is, the frame rail 14 and the bracket 38 may be separately formed and subsequently fixed together. Alternatively, the bracket 38 and the respective frame rail 14 may be monolithic. For the purposes of this disclosure, "monolithic" means a single-piece unit, i.e., a continuous piece of material without any fasteners, joints, welding, adhesives, etc., fixing multiple pieces to each other.

The cable 20 is designed, i.e., sized and shaped, to oppose movement of the engine 18 towards the bulkhead 16 during a vehicle frontal impact. The cable 20 may, for example, include several strands of wire that are bonded, twisted, and/or braided together into the shape of a helix. The cable 20 may be designed to have a high tensile strength for transferring heavy loads between the frame rails 14. The cable 20 may have any suitable diameter. The cable 20 may be made of any suitable material such as metal, etc.

With reference to FIG. 3, the cable 20 is disposed between the bulkhead 16 and the engine 18. For example, the cable 20 may be disposed vehicle-rearward of the shock tower brackets 36, i.e., between the shock tower brackets 36 and the bulkhead 16 relative to the vehicle longitudinal axis L. The cable 20 extends from one frame rail 14 to the other frame rail 14, e.g., along the cross-vehicle axis C. Specifically, the cable 20 extends along the axis A through the holes 32 in the frame rails 14, i.e., the spacers 34. That is, the cable 20 extends from the outboard face 30 of one frame rail 14 to the outboard face 30 of the other frame rail 14. The cable 20 includes ends (not numbered) fixed to the frame rails 14. For example, one end may be fixed to one bracket 38, and the other end may be fixed to the other bracket 38. As one example, each end may be threaded and may threadedly engage the respective brackets 38, e.g., via a weld nut. Alternatively, each end may be fixed directly to the respective frame rail 14 via fasteners, welding, etc. The ends of the cable 20 are fixed to the frame rails 14 between the engine 18 and the bulkhead 16. For example, the ends of the cable 20 may be fixed to the frame rails 14 between the shock tower brackets 36 and the bulkhead 16 relative to the vehicle-longitudinal axis L.

During operation of the vehicle 10, the cable 20 may vibrate, e.g., due to the vehicle 10 traversing a road disturbance, due to engine 18 vibrations being transferred through the frame rails 14, etc. The cable 20 may, for example, be spaced from the engine 18 such that the cable 20 does not contact the engine 18 regardless of whether the cable 20 vibrates during operation of the vehicle 10. That is, the cable 20 may be spaced from the engine 18 such that a distance between the cable 20 and the engine 18 is greater than a displacement of a point on the cable 20 caused by vibrations during operation of the vehicle 10. Alternatively, at least some portions of the cable 20 may contact the engine 18. For example, some portions of the cable 20 may contact the engine 18 in examples in which the cable 20 vibrates. As another example, some portions of the cable 20 may contact the engine 18 regardless of whether the cable 20 vibrates. That is, the cable 20 may contact the engine 18, e.g., in examples in which the vehicle 10 is not in operation.

In examples in which at least some portions of the cable 20 contact the engine 18, the cable 20 may be at least partially covered by a covering (not shown). For example, the entire cable 20 may be covered by the covering. In such an example, the covering may extend from one frame rail 14 to the other frame rail 14. As another example, a plurality of coverings may be spaced from each other along the cable 20. In such an example, the coverings may extend any suitable amount along the cable 20, i.e., along the cross-vehicle axis C. The coverings may extend a same or different amount along the cable 20. The coverings may cover the portions of the cable 20 that contact the engine 18. The covering(s) may extend circumferentially around the cable 20.

The covering may be any suitable material, e.g., fabric, foam, etc. The covering may be contact the engine 18, i.e., be compressed between the cable 20 and the engine 18. In such an example, the covering may reduce noise/vibration/harness (NVH), e.g., by preventing the cable 20 from directly contacting the engine 18. That is, the covering may provide a cushion between the cable 20 and the engine 18 to reduce NVH.

The cable 20 is pre-tensioned. Specifically, the cable 20 is under tension between the one frame rail 14 and the other frame rail 14 absent force applied by the engine 18, i.e., before an impact that forces the engine 18 into the cable 20. In other words, the cable 20 is taught with tensile force between the frame rails 14. A vehicle-frontal impact may force the engine 18 vehicle rearward, e.g., a rigid pole frontal crash test in which the rigid barrier 22 impacts the vehicle 10, as set forth above (see FIG. 4A). Since the cable 20 is under tension before force is applied by the engine 18, the cable 20 distributes the force distributed to the engine 18 during the vehicle-frontal impact (e.g., via the rigid barrier 22 during a rigid pole frontal crash test) to the frame rails 14, which can assist in opposing movement of the engine 18 during the rigid pole frontal crash test and reducing the likelihood of engine 18 intrusion to the passenger cabin, as shown in FIG. 4B.

During a vehicle impact, such as a rigid pole frontal crash test, the rigid barrier 22 impacts the vehicle 10, and causes the engine 18 to move rearward along the vehicle-longitudinal axis L, i.e., towards the passenger cabin. Since the cable 20 is under tension prior to the impact, the cable 20 distributes a force from the impact to the frame rails 14. Specifically, the cable 20 remains attached to the frame rails 14 during the vehicle impact. The tension of the cable 20 results in the cable 20 opposing movement of the engine 18 toward the bulkhead 16 to reduce the likelihood that the engine 18 intrudes inwardly into the passenger cabin of the vehicle 10.

The disclosure has been described in an illustrative manner, and it is to be understood that the terminology which has been used is intended to be in the nature of words of description rather than of limitation. The adjectives "first" and "second" are used throughout this document as identifiers and are not intended to signify importance or order. Many modifications and variations of the present disclosure are possible in light of the above teachings, and the disclosure may be practiced otherwise than as specifically described.

The invention claimed is:

1. A vehicle comprising:
a frame including two frame rails spaced from each other along a cross-vehicle axis and a bulkhead extending from one frame rail to the other frame rail, the frame rails being elongated along a vehicle-longitudinal axis;
an engine disposed between the frame rails and spaced from the bulkhead along the vehicle-longitudinal axis; and
a cable elongated along the cross-vehicle axis and disposed between the engine and the bulkhead, the cable being connected to each frame rail between the engine and bulkhead;
each frame rail including an inboard face facing the engine and an outboard face spaced from the inboard face along the cross-vehicle axis, the cable extending through the inboard faces and the outboard faces of the frame rails.

2. The vehicle of claim 1, wherein the cable is fixed to the outboard face of each frame rail.

3. The vehicle of claim 1, further comprising two brackets, wherein each bracket is fixed to the outboard face of one respective frame rail, the cable being threadedly engaged with the brackets.

4. The vehicle of claim 1, wherein the cable is fixed relative to each frame rail.

5. The vehicle of claim 1, wherein the cable extends through the frame rails along an axis generally parallel to the cross-vehicle axis.

6. The vehicle of claim 1, wherein the cable is spaced from the engine and the bulkhead.

7. The vehicle of claim 1, wherein the cable is under tension between the frame rails.

8. The vehicle of claim 1, further comprising two spacers, wherein each spacer extends through one respective frame rail, and the cable extends through the spacers.

9. The vehicle of claim 8, wherein the spacers are aligned with each other along the vehicle-longitudinal axis.

10. The vehicle of claim 1, wherein the cable is designed to oppose movement of the engine towards the bulkhead during a vehicle frontal impact.

11. A vehicle frame comprising:
two frame rails spaced from each other along a cross-vehicle axis;
two shock tower brackets, each shock tower bracket being connected to one respective frame rail; and
a cable elongated along the cross-vehicle axis and disposed vehicle-rearward of the shock tower brackets, the cable being connected to each frame rail vehicle-rearward of the shock tower brackets;
each frame rail including an outboard face facing the respective shock tower bracket and an inboard face spaced from the outboard face along the cross-vehicle axis, the cable extending through the inboard faces and the outboard faces of the frame rails.

12. The vehicle frame of claim 11, wherein the cable extends through the frame rails along an axis generally parallel to the cross-vehicle axis.

13. The vehicle frame of claim 11, wherein the cable is under tension between the frame rails.

14. The vehicle frame of claim 11, wherein the cable is fixed to the outboard face of each frame rail.

15. The vehicle frame of claim 11, further comprising two brackets, wherein each bracket is fixed to the outboard face of one respective frame rail, the cable being threadedly engaged with the brackets.

16. The vehicle frame of claim 11, wherein the cable is fixed relative to each frame rail.

17. The vehicle frame of claim 11, further comprising two spacers, wherein each spacer extends through one respective frame rail, and the cable extends through the spacers.

18. The vehicle frame of claim 17, wherein the spacers are aligned with each other along a vehicle-longitudinal axis.

19. A vehicle comprising:
a frame including two frame rails spaced from each other along a cross-vehicle axis and a bulkhead extending from one frame rail to the other frame rail, the frame rails being elongated along a vehicle-longitudinal axis;
an engine disposed between the frame rails and spaced from the bulkhead along the vehicle-longitudinal axis; and
a cable elongated along the cross-vehicle axis and disposed between the engine and the bulkhead, the cable being connected to each frame rail between the engine and bulkhead;
the cable extending through the frame rails along an axis generally parallel to the cross- vehicle axis.

20. The vehicle of claim 19, wherein the cable is under tension between the frame rails.

* * * * *